Nov. 6, 1928. 1,690,766
W. ASTLE
VENT VALVE FOR AIR BRAKE APPARATUS
Original Filed Jan. 5, 1927  2 Sheets-Sheet 1
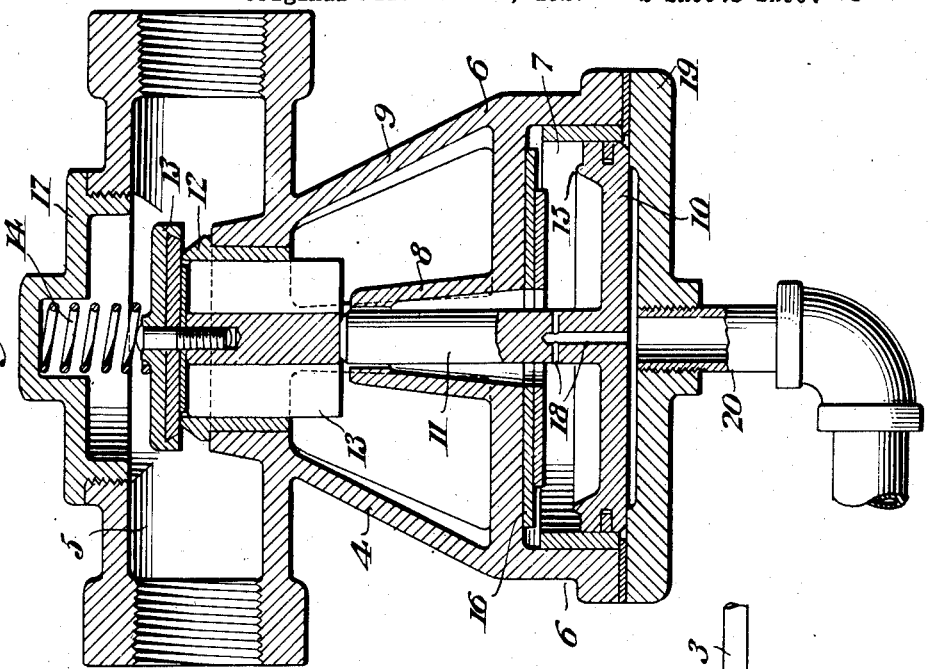
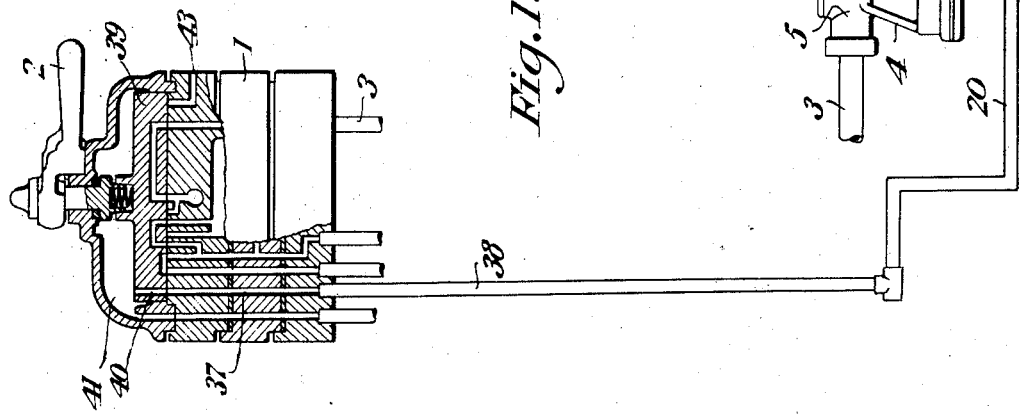
INVENTOR
*William Astle*
BY
ATTORNEYS

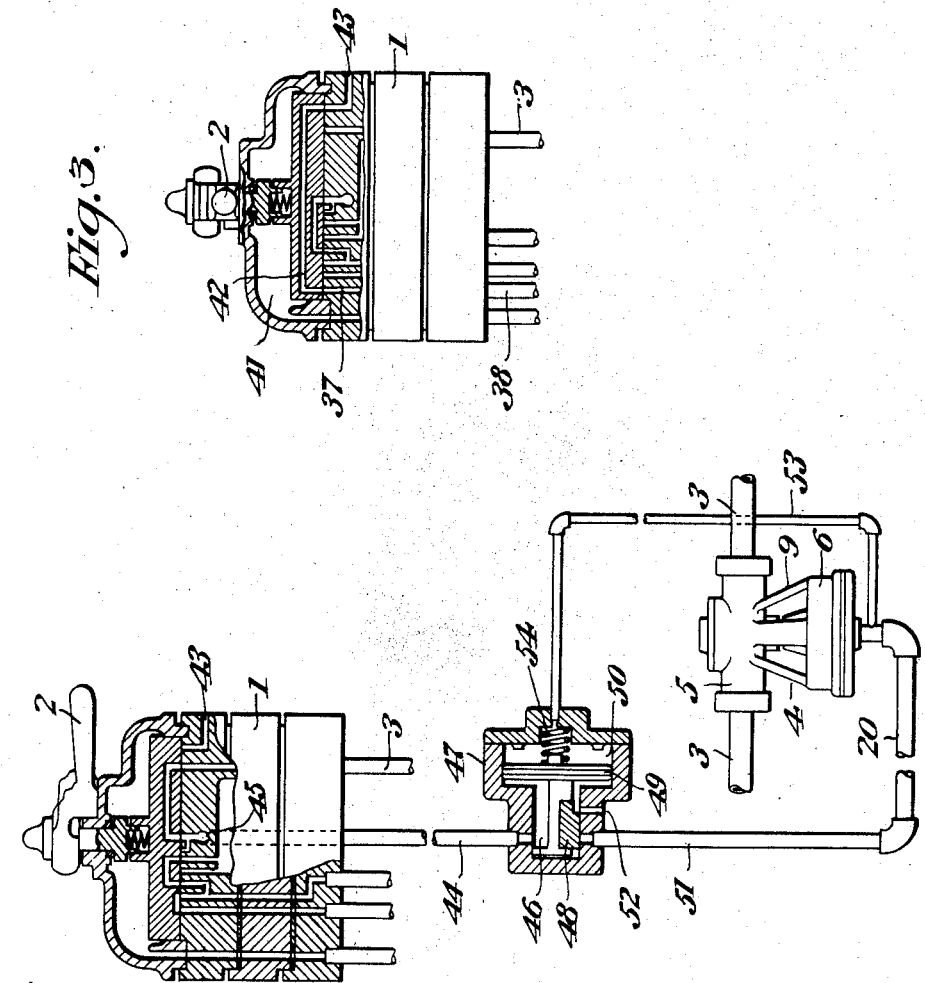

Patented Nov. 6, 1928.

1,690,766

UNITED STATES PATENT OFFICE.

WILLIAM ASTLE, OF BROOKLYN, NEW YORK, ASSIGNOR TO AUTOMATIC STRAIGHT AIR BRAKE COMPANY, OF WILMINGTON, DELAWARE, A CORPORATION OF DELAWARE.

VENT VALVE FOR AIR-BRAKE APPARATUS.

Application filed January 5, 1927, Serial No. 159,163. Renewed April 18, 1928.

The main object of the invention is to provide means whereby when the engineer's brake valve is placed in emergency position for an emergency application of the brakes the brake pipe will be vented to atmosphere through a suitable vent valve connected directly to the brake pipe. The vent valve is designed to be positively forced to its open position and means are provided whereby when the engineer's brake valve is in emergency position the required force will be applied directly to the vent valve.

Another object of the invention is to provide a brake pipe vent valve and means for operating it to open position, which valve will be normally held closed and which cannot be moved to open position by any movement of the engineer's brake valve except a complete movement of said valve to emergency application position. The purpose of this feature of the invention is to prevent an accidental, or unintended, opening of the vent valve in any position of the engineer's brake valve and during any variation in the brake pipe pressure, except when the engineer's brake valve is moved to emergency position.

In the drawings,

Fig. 1 is a diagrammatic view showing the vent valve and the engineer's brake valve and the operating connections between said valves;

Fig. 2 a vertical central sectional view of the vent valve;

Fig. 3 a detail diagrammatic sectional view of the engineer's brake valve in a position other than emergency position; and Fig. 4 a diagrammatic view of the engineer's brake valve and the vent valve, showing the vent valve operated by the brake pipe exhaust through the brake valve, with the brake valve handle in emergency position.

Referring to various parts by numerals, 1 designates an engineer's brake valve, provided with the usual manipulating handle 2. This brake valve may be of the usual standard construction. As is well known, the handle of the engineer's brake valve is moved into various positions for bringing about the various operations of the control valves, or triple valves, throughout the train. This handle has an emergency position, in which position the brake pipe is vented to atmosphere for the purpose of bringing about an emergency application of the brakes.

The brake pipe 3 runs throughout the train and is connected to the triple valves in the usual manner. In this brake pipe, at a convenient position on the engine or on the engine tender, is placed a vent valve 4. As shown in the drawings this vent valve comprises a coupling member 5, to the ends of which the brake pipe 3 is connected so that the coupling member 5 is directly in the brake pipe. Depending from the coupling member is a piston casing 6, said casing being preferably integral with the coupling member 5. In the piston casing 6 is formed a piston chamber 7 and extending upwardly from the center of the piston chamber is a central tubular guide 8. The piston casing is connected to the coupling member by arms 9, said arms forming a skeleton frame, as shown in the drawings. In the piston chamber 7 is arranged a piston 10, said piston being formed with an upwardly extending operating element or stem 11 which travels through the guide 8. The coupling member carries a valve seat 12 on which a valve 13 is normally held by means of a spring 14. The spring 14 yieldingly holds the valve 13 seated and closes communication between the interior of the coupling member and the interior of the skeleton frame formed by the arms 9. The upper end of the stem 11 is adapted to contact with the lower end of the valve 13 and when the valve 13 is seated the piston 10 is at the bottom of the piston chamber 7. The piston 10 is formed on its upper surface with an annular upstanding rib 15 which when the piston is forced upwardly will seat on the gasket 16 and seal the piston chamber 7 to thereby prevent the escape of air around the piston 10 and up through the guide 8. When the valve 13 is forced upwardly from its seat, as will be hereinafter described the interior of the coupling member, and the connected brake pipe, will be in communication with the atmosphere through the port controlled by the valve 13 and through the skeleton frame formed by the arms 9. The coupling member is provided with a screw cap 17 directly in line with the valve 13 in order to give access to the valve. The stem of the piston is provided with leak port 18 so that any air trapped in the piston chamber below the piston may leak out above the piston and then out to atmosphere through the tubular guide 8. The lower end of the piston chamber is closed by the cap plate 19.

The piston 10 is designed to be forced upwardly by pressure admitted to the piston chamber below the piston through a pipe 20.

The engineer's brake valve is provided with a port 37 which at its lower end is connected to a pipe 38 which is connected to the pipe 20 which leads to the piston chamber 7. The rotor valve 39 of the engineer's brake valve is provided with a port 40 which when the engineer's brake valve handle is in emergency position registers with port 37 and connects said port to the main reservoir chamber 41 of the engineer's brake valve, said chamber being above the rotor 39. It is clear, therefore, that when the engineer's brake valve handle is in emergency position main reservoir air may flow from the engineer's brake valve direct to the pipe 20 to operate the vent valve. When the engineer's brake valve handle is moved away from its emergency application position port 40 will be moved out of register with port 37.

It is desirable that the pipes 38 and 20 be vented to asmosphere in all positions of the brake valve handle 2 other than the emergency position. As shown in Fig. 3 the rotor of the engineer's brake valve is provided with a port 42 which, in all positions of the rotor 39 except emergency position, connects port 37 with an atmospheric port 43. By this means the chamber 7 below the piston 10 will be vented to atmosphere so that the pressure in chamber 7 will be quickly reduced to atmospheric pressure and valve 13 will be quickly seated whenever the engineer's brake valve is moved away from emergency position.

In the arrangement of parts shown in Fig. 4 a pipe 44 is connected to the exhaust port 45 of the engineer's brake valve. Pipe 44 is connected to the valve chamber 46 of a control valve 47. In the valve chamber 46 is a small piston valve 48 which is connected to the stem of a piston 49. The said piston is of considerable area and reciprocates in a chamber 50. A pipe 51 is connected to a large port in the seat of the valve 48, said port being normally closed with the slide valve in its normal position. A spring 54 yieldingly holds the piston and the valve 48 in position to close pipe 51. The seat of the valve 48 is formed with an atmospheric port 52, which in the normal position of the slide valve places the chamber 46 directly in communication with atmosphere. The pipe 51 is connected to the pipe 20 which leads to the chamber 7 below the piston 10 of the brake pipe vent valve. A pipe 53 is connected to the pipe 20 at a point near the casing 6, the other end of said pipe being connected to the chamber 50 on the opposite side of the piston from the slide valve.

When the brake valve handle is in emergency position the brake pipe is connected to the exhaust port 45 for the purpose of quickly reducing brake pipe pressure. This brake pipe exhaust will flow through the pipe 44 into the valve chamber 46. The sudden rush of air into the chamber 46 will move the piston 49 against its spring uncovering the port leading to pipe 51 and covering the exhaust port 52. Air will then flow from chamber 46 through pipes 51 and 20 into the chamber 7 and force the piston 10 upwardly thereby opening the brake pipe vent valve. If, for any reason, the piston 49 and the slide valve 48 should stick and not be moved by the flow of air into chamber 46 the atmospheric port 52 will remain open and the air from pipe 44 will flow direct to atmosphere thereby bringing about the ordinary emergency operation of the triple valves. If, for any reason, the piston 10 and the vent valve 13 should stick and not respond to the flow of pressure into chamber 7 below the piston 10 the accumulated pressure will flow through pipe 53 into the chamber 50 of the control valve at the spring side of the piston 49. This will result in a substantial equalization of pressures on opposite sides of the piston 49 and the spring 54 will move the piston and the slide valve 48 back to normal position thus closing communication with pipe 51 and opening the atmospheric port. It is clear therefore that in the event that the control valve fails to work or that the vent valve fails to work brake pipe pressure will be exhausted through pipe 44 to atmosphere whenever the engineer's brake valve is placed in emergency position.

In the emergency position of the engineer's brake valve the flow of air through the exhaust port 45 and into pipe 44 will be of sufficient volume and at a sufficient pressure to move the control valve 47 and piston 10 and open the valve 13. In the service position of the engineer's brake valve the equalizing reservoir is connected to the exhaust port 45. This operation, however, will not release sufficient air into the pipe 44 to operate the control valve and the piston 10. The equalizing reservoir is of small volume and the pipes 44 and 20 and valve casing 47 are of considerable volume so that the small amount of air released into pipe 44 from the equalizing reservoir in the service position of the engineer's brake valve will not result in sufficient pressure under the piston 10 to raise said piston. Whatever pressure is developed in the pipe 44 and the valve casing 47 during a service application, or a service manipulation of the brake valve, will leak down to the atmosphere through the port 52. It is only when the brake valve is in emergency position that sufficient pressure will flow through the exhaust port 45 to operate the control valve and the vent valve.

It is obvious that other arrangements of ports and passages may be made in the engineer's brake valve, by means of which the necessary fluid pressure will be supplied to the vent valve operating means when the engineer's brake valve handle is in emergency application position.

What I claim is:

1. An air brake apparatus comprising an engineer's brake valve including a brake valve operating handle; a brake pipe; a brake pipe vent valve; a control valve; means operable when the brake valve handle is in emergency application position to open the control valve; a vent valve operating piston; and means whereby when the control valve is open the piston will be moved to open the vent valve.

2. An air brake apparatus comprising an engineer's brake valve including a brake valve operating handle; a brake pipe; a brake pipe vent valve; a vent valve piston; and means operable to move the said piston to thereby open the vent valve only when the brake valve operating handle is in emergency application position.

3. An air brake apparatus comprising an engineer's brake valve including a brake valve operating handle; a brake pipe; a brake pipe vent valve; a vent valve piston; and means operable to admit fluid pressure to the vent valve piston to open the vent valve only when the brake valve operating handle is in emergency application position.

4. An air brake apparatus comprising an engineer's brake valve including a brake valve operating handle; a brake pipe; a brake pipe vent valve; a vent valve operating element, and means operable to move said element to force the vent valve to open position, against the pressure in the brake pipe, only when the brake valve operating handle is in emergency application position.

5. An air brake apparatus comprising an engineer's brake valve including a brake valve operating handle; a brake pipe; a brake pipe vent valve; a vent valve operating element; and means operable to move said element to open the vent valve only when the brake valve operating handle is in emergency application position and independently of the variations of pressure in the brake pipe.

6. An air brake apparatus comprising an engineer's brake valve including a brake valve operating handle; a brake pipe; a brake pipe vent valve; and means operable to connect a source of fluid pressure supply to the vent valve means to open the vent valve only when the brake valve operating handle is in emergency application position.

7. An air brake apparatus comprising an engineer's brake valve including a brake valve operating handle; a brake pipe; a brake pipe vent valve; a vent valve operating element; and means operable to connect a source of fluid pressure supply to the vent valve operating element to open the vent valve only when the brake valve operating handle is in emergency application position.

8. An air brake apparatus comprising an engineer's brake valve including a brake valve operating handle; a brake pipe; a brake pipe vent valve; and means operable to connect a source of fluid pressure supply to the vent valve means to open the vent valve only when the brake valve operating handle is in emergency application position, and independently of the variations of pressure in the brake pipe.

9. An air brake apparatus comprising an engineer's brake valve including a brake valve operating handle; a brake pipe; a brake pipe vent valve; a vent valve operating means; and means connecting the vent valve operating means to the exhaust port of the engineer's brake valve whereby when the engineer's brake valve is in emergency position the brake pipe exhaust through said valve will open the brake pipe vent valve.

10. An air brake apparatus comprising an engineer's brake valve including a brake valve operating handle; a brake pipe; a brake pipe vent valve; a vent valve operating means; a control valve; means connecting the control valve to the exhaust port of the engineer's brake valve whereby when the engineer's brake valve is in emergency position the brake pipe exhaust through said valve will open the control valve; and means connecting the vent valve operating means to the control valve whereby when the control valve is opened the vent valve will be opened.

11. An air brake apparatus comprising an engineer's brake valve including a brake valve operating handle; a brake pipe; a brake pipe vent valve; a vent valve operating means; a control valve; means connecting the control valve to the exhaust port of the engineer's brake valve whereby when the engineer's brake valve is in emergency position the brake pipe exhaust through said valve will open the control valve; means connecting the vent valve operating means to the control valve whereby when the control valve is opened the vent valve will be opened; and means to permit the escape of air from the control valve casing in the closed position of the control valve.

12. An air brake apparatus comprising an engineer's brake valve including a brake valve operating handle; a brake pipe; a brake pipe vent valve; a vent valve operating means; a control valve; means connecting the control valve to the exhaust port of the engineer's brake valve whereby when the engineer's brake valve is in emergency position the brake pipe exhaust through said valve will open the control valve; means connecting the vent valve operating means to the control valve whereby when the control valve is opened the vent valve will be opened; and means whereby a failure to open the vent will result in a closure of the control valve and the opening of an atmospheric port in the control valve chamber.

In testimony whereof I hereunto affix my signature.

WILLIAM ASTLE.